C. & E. G. YOUNG.
ADJUSTABLE SEAT FOR SIDEHILL IMPLEMENTS.
APPLICATION FILED MAY 2, 1908.

918,249.

Patented Apr. 13, 1909.

WITNESSES:
F. C. Fliedner
Nellie B. Keating.

INVENTORS
C. Young,
E. G. Young,
BY
Fm. Wright,
ATTORNEY.

UNITED STATES PATENT OFFICE.

CHESTER YOUNG AND EDWIN G. YOUNG, OF LIVERMORE, CALIFORNIA.

ADJUSTABLE SEAT FOR SIDEHILL IMPLEMENTS.

No. 918,249.

Specification of Letters Patent.

Patented April 13, 1909.

Application filed May 2, 1908. Serial No. 430,483.

*To all whom it may concern:*

Be it known that we, CHESTER YOUNG and EDWIN G. YOUNG, citizens of the United States, residing at Livermore, in the county of Alameda and State of California, have invented new and useful Improvements in Adjustable Seats for Sidehill Implements, of which the following is a specification.

The present invention relates to an adjustable seat adapted for agricultural implements used on the sides of hills, the object of the invention being to provide a seat of this character, of such construction that the rider can quickly and easily adjust the seat proper to a level position for any change in the slope of the hill, or when reversing the direction in which the implement is traveling.

Figure 1:
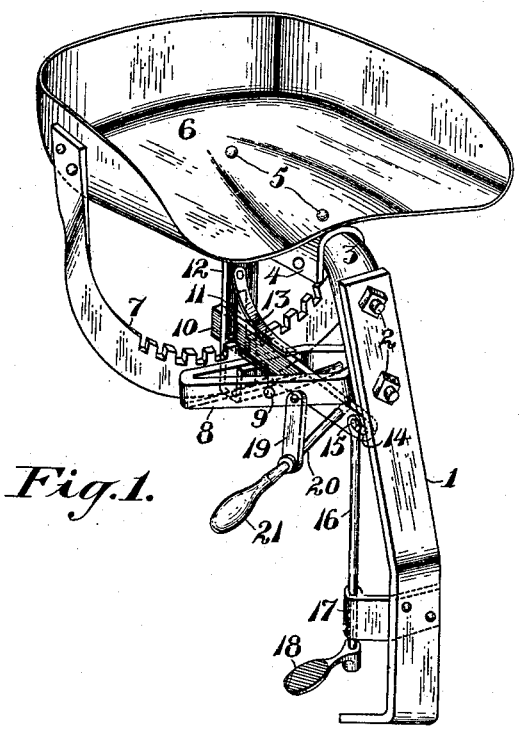
Figure 2:
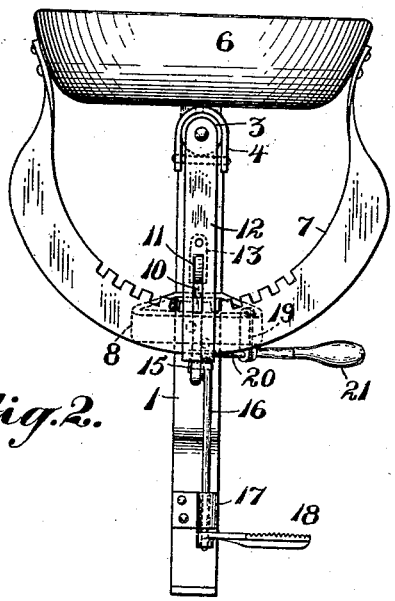

In the accompanying drawing, Figure 1 is a perspective view of the seat; Fig. 2 is a rear view of the same.

Referring to the drawing, 1 indicates a standard or post, to which is secured, as shown at 2, a rearwardly extending seat bar 3, upon which is mounted a channel-shaped rocking plate 4, to which is secured, as shown at 5, the seat proper 6. To the sides of said seat 6 are secured the ends of an internal segmental rack 7. Secured to said standard 1 is a horizontal rearwardly extending yoke 8, and extending transversely across said yoke is a pivot bolt 9. On said bolt is pivoted a locking lever 10, the rear end of which passes through a slot 11 in a depending guide 12. Said guide is secured upon the end of the seat bar and is bent upward at its lower end and secured to the rear side of the yoke 8, thus forming a U-shaped guide for said rack 7. Said locking lever is normally caused to engage one of the notches of the segmental rack 7 by means of a spring 13, secured to said guide 12 and pressing upon the upper edge of said lever 10 behind its pivot. The front end of said lever 10 is slotted, as shown at 14, and through said slot extends a pin 15 connected to a rod 16 passing at its lower end through a guide 17 secured to the standard 1. Secured to the lower end of said rod 16 below said guide 17 is a laterally extending foot plate 18. Depending from said yoke 8 is a hanger 19 through the lower end of which passes a hand lever 20 having a handle 21, the inner end of said lever 20 engaging the locking lever 10 in front of its pivot.

When the operator wishes to adjust the slope of the seat either when arriving at a differently sloped part of the hill, or when reversing the direction of the implement on the side of the hill, then, either by means of the hand lever or by the foot lever, he depresses the front end of the locking lever 10, thereby raising the rear end against the action of the spring 13, so that the segmental rack is no longer locked by said locking lever. Then by throwing his weight to the proper side of the seat, he can level the seat upon the seat bar 3, when, upon releasing the hand lever or the foot lever, as the case may be, the locking lever again, under the action of the spring 13 drops into a position engaging a notch in said segmental rack 7, and the seat is then locked, so as to be substantially level although the frame of the implement may be considerably sloped.

The value of this invention arises from the fact that, in directing agricultural implements on the side of the hill, unless suitable provision is made for changing the slope of the seat, the rider must sit upon a seat having substantially the same slope as the hill, and his position is at such times unsteady and precarious, so that in case of unusual jolts in riding over rough ground, the rider is liable to be thrown from the seat. To retain his position on such a sloping seat, the rider must grasp with the hand some portion of the frame, thus allowing the free use of only one hand for directing the horses and otherwise operating the machine. With the construction of seat shown herein this is no longer necessary, as the rider can quickly adjust the seat to a horizontal position, permitting him to sit securely thereon.

We claim:—

1. In an apparatus of the character described, a post having at the top a rearward extension, a seat vibratable about said extension as an axis, a segmental rack extending in a plane transverse to said extension and secured to said seat, a locking device adapted to engage any one of the notches to lock the same, and having a forwardly extending part by which it may be actuated, and a fixed guide for said locking device, substantially as described.

2. In an apparatus of the character described, the combination of a post, a rearward extension therefrom, a channel shaped seat support on said extension, a seat secured to said support, a rack secured to said seat, a device adapted to engage any one of the notches of said rack to lock the same in position, a spring for causing said device to engage said notch, and means for removing said device from said rack, substantially as described.

3. In an apparatus of the character described, the combination of a post, a rearward extension therefrom, a channel shaped seat support on said extension, a seat secured to said support, a rack secured to said seat, a device adapted to engage any one of the notches of said rack to lock the same in position, a spring for causing said device to engage said notch, and means for removing said device from said rack, comprising a part adapted to be engaged by the foot and a part adapted to be engaged by the hand of a rider seated on said seat, substantially as described.

4. In an apparatus of the character described, the combination of a post, a rearward extension therefrom, a channel-shaped seat support on said extension, a seat secured to said support, an internal segmental rack, secured at its ends to the sides of said seat, a rearwardly extending yoke secured to said post, a depending guide secured to the end of said post, its lower end being bent upward to form a guide for the rack and seat, said upwardly bent portion being secured to the yoke, said guide being slotted, a lever pivoted in said yoke and passing through said slot, a spring adapted to depress said lever into one of the notches of the rack, and means for rocking said lever against the action of said spring, substantially as described.

5. In an apparatus of the character described, the combination of a post, a rearward extension therefrom, a channel-shaped seat support on said extension, a seat secured to said support, an internal segmental rack, secured at its ends to the sides of said seat, a rearwardly extending yoke secured to said post, a depending guide secured to the end of said post, its lower end being bent upward to form a guide for the rack and seat, said upwardly bent portion being secured to the yoke, said guides being slotted, a lever pivoted in said yoke and passing through said slot, a spring adapted to depress said lever into one of the notches of the rack, and means for rocking said lever against the action of said spring, adapted to be operated by the foot, and other means adapted to be operated by the hand, of a rider seated on said seat, substantially as described.

In testimony whereof we have hereunto set our hands in the presence of two subscribing witnesses.

CHESTER YOUNG.
EDWIN G. YOUNG.

Witnesses:
R. C. SWEET,
M. G. CALLAGHAN.